United States Patent
Rao et al.

(10) Patent No.: US 9,413,696 B2
(45) Date of Patent: Aug. 9, 2016

(54) SYSTEM ARCHITECTURE AND METHOD FOR COMMUNICATION BETWEEN DEVICES OVER BACKPLANE TO REDUCE INTERFACE COUNT

(75) Inventors: Srinivas Rao, Bangalore (IN); Gajendra Singh Ranka, Bangalore (IN)

(73) Assignee: Tejas Networks Ltd, Bangalore (IN)

( * ) Notice: Subject to any disclaimer, the term of this patent is extended or adjusted under 35 U.S.C. 154(b) by 307 days.

(21) Appl. No.: 14/008,554

(22) PCT Filed: Jul. 8, 2011

(86) PCT No.: PCT/IB2011/053039
§ 371 (c)(1),
(2), (4) Date: Sep. 29, 2013

(87) PCT Pub. No.: WO2012/131447
PCT Pub. Date: Oct. 4, 2012

(65) Prior Publication Data
US 2014/0086261 A1    Mar. 27, 2014

(30) Foreign Application Priority Data
Mar. 30, 2011    (IN) ............................ 1027/CHE/2011

(51) Int. Cl.
*H04L 12/931*    (2013.01)
*G06F 13/40*    (2006.01)
*G06F 13/36*    (2006.01)

(52) U.S. Cl.
CPC .............. *H04L 49/405* (2013.01); *G06F 13/36* (2013.01); *G06F 13/4068* (2013.01)

(58) Field of Classification Search
CPC .... H04L 49/405; G06F 13/4068; G06F 13/36
See application file for complete search history.

(56) References Cited

U.S. PATENT DOCUMENTS

| | | | |
|---|---|---|---|
| 2001/0021171 A1 | 9/2001 | Notani | |
| 2004/0001579 A1* | 1/2004 | Feinberg | H04M 3/60 379/156 |
| 2004/0213188 A1 | 10/2004 | Struhsaker | |
| 2009/0135947 A1* | 5/2009 | Bahng | H04L 25/03203 375/295 |
| 2012/0257903 A1* | 10/2012 | Taniguchi | H04J 3/1652 398/182 |
| 2012/0314762 A1* | 12/2012 | Herrmann | H04N 21/2362 375/240.02 |

* cited by examiner

*Primary Examiner* — Ajay Cattungal
(74) *Attorney, Agent, or Firm* — Deborah A. Gador

(57) ABSTRACT

The present disclosure discloses a system architecture and method for reducing pin count on a backplane connecting plurality of devices. In an embodiment, the signals from the plurality of devices are multiplexed or mapped into time slots using a MapMux device. The MapMux device then sends the multiplexed or mapped signals over backplane on TDM bus. The MapMux device at the receiving end de-multiplexes or de-maps and sends the received signals to plurality of devices for further processing. The present disclosure allows a large number of signals to be passed between the devices through a single stream.

14 Claims, 4 Drawing Sheets

SYSTEM ARCHITECTURE AND METHOD FOR COMMUNICATION BETWEEN DEVICES OVER BACKPLANE TO REDUCE INTERFACE COUNT

CROSS-REFERENCE TO RELATED APPLICATION

The present application claims priority to Indian patent application serial number 1027/CHE/2011 filed on Mar. 30, 2011, and claims the benefit of international application PCT/IB2011/053039 filed Jul. 8, 2011, the entire contents of which are incorporated by reference.

TECHNICAL FIELD

The present disclosure relates to the field of networks. In a particular, the present disclosure relates to system architecture and a method for communication between devices connected over a backplane. More particularly, the embodiments of the disclosure relates to technique for reducing pin count on a backplane.

BACKGROUND OF THE DISCLOSURE

Many telecommunications switching systems might include plurality of I/O Cards, also known as network interface cards or line cards for processing different data from network interfaces like E1, DS1, STM-n, OC-n etc and send this processed data to traffic switch (also referred to as Switch card) to switch data from one network interface to other. In such telecommunication systems, the data from line cards to switch card passes over a backplane which connects various cards in a system. Such telecommunication system is called network element. The network interface cards also extract various overhead data from the interfaces and pass this overhead to overhead switch to switch across various other interfaces and to the processor for further processing.

In order to avoid single point of failure, it is well know method in the telecommunication systems to replicate critical sub systems like power supply, switch card, network element controller, system synchronizer etc. Such sub systems are called redundant sub systems, one acting as master and one or more acting as slave sub systems. Further, the critical sub-systems like traffic switch, system synchronizer and chassis controller are integrated into single a card called controller. Such cards are replicated, one controller acting as master and one or more acting as slave controllers.

In network elements, where the line cards do not contain processor sub systems having processor and associated memory, various control and status signals are passed from each of the line cards to each of the controller cards and vice versa.

Consider an exemplary embodiment of conventional system, where there are two controller cards, 12 interface cards and 20 status or control signals running between each of the line card to each of the controller card. This makes 40 pins requirement at line card backplane interface and 240 pins requirement at controller card backplane interface. The increase in number of pins on the line card backplane interface and the controller card backplane interface will increase the routing complexity of backplane and complexity of PCB of the backplane. More over the requirement of 240 pins at controller backplane interface makes controller card designs complex and the controller card may not be able to accommodate so many connector pins along with traffic connectors. Also, the package size of the system is increased, which adds to the cost of implementing the telecommunications network. Further, future expansion of the system to include some more status or control signals is unmanageable.

FIG. 1 illustrates another embodiment of a conventional system illustrating a block diagram of devices connected to a backplane. Each of the devices of the first and second devices is connected to the backplane using a backplane connector. The devices can be either of a network interface card or a controller. The network interface card sends one or more signals to the controllers. These signals are sent using a separate pin for each of the signal. As a result, the numbers of pins on the network interface card, the controller and the backplane increases leading to increase of size of the backplane. Also, the cost of implementing such a system increases as managing such large number of pins on the backplane becomes difficult.

Therefore, there is a need to develop system architecture and a method to achieve effective communication between devices on a backplane by reducing number of pins on the backplane.

SUMMARY OF THE DISCLOSURE

This section provides a general summary of the disclosure, and is not a comprehensive disclosure of its full scope or all of its features.

The present disclosure solves the limitations of existing arts by providing a methodology for reducing pin counts in a backplane.

In one embodiment, the present disclosure decreases the routing complexity at PCB of backplane.

In one embodiment, the system architecture and the method of the present disclosure is cost effective, easily implemented and compatible with existing network architectures.

Additional features and advantages are realized through the techniques of the present disclosure. Other embodiments and aspects of the disclosure are described in detail herein and are considered a part of the claimed disclosure.

An embodiment of the present disclosure relates to system architecture for communication of devices over one or more backplanes. The system architecture comprises at least one first device and second device for sending, receiving and processing signals, at least one TDM bus for sending and receiving data and signals over the backplane, at least one MapMux device coupled to at least one first device and the TDM bus, and at least one MapMux device coupled to at least one second device and the TDM bus. The system further comprises at least one data bus for sending and receiving data to and from at least one MapMux device and a selection unit for selecting a predetermined functionality of the MapMux device.

An embodiment of the present disclosure relates to method for communicating between a plurality of devices connected over one or more backplanes. The method comprises receiving a first input, an incoming data and a first select signal by at least one MapMux device connected to a plurality of first devices. Then, the first input is multiplexed to output a first processed data and the incoming data is de-multiplexed, based on the select signal, by at least one MapMux device connected to the plurality of first devices. The de-multiplexed incoming data is distributed among the plurality of first devices. The first processed data is then sent over the backplane on a TDM bus. Further, at least one MapMux device connected to a plurality of second devices receives the first processed data, a second input and a second select signal. The first processed data is then de-multiplexed for distribution among the plurality of second devices and the second input is multiplexed to generate a second processed data, based on a second select signal, by at least one MapMux device connected to the plurality of second devices. Finally, the second processed data is transferred over the backplane on the TDM bus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

Figure 1:
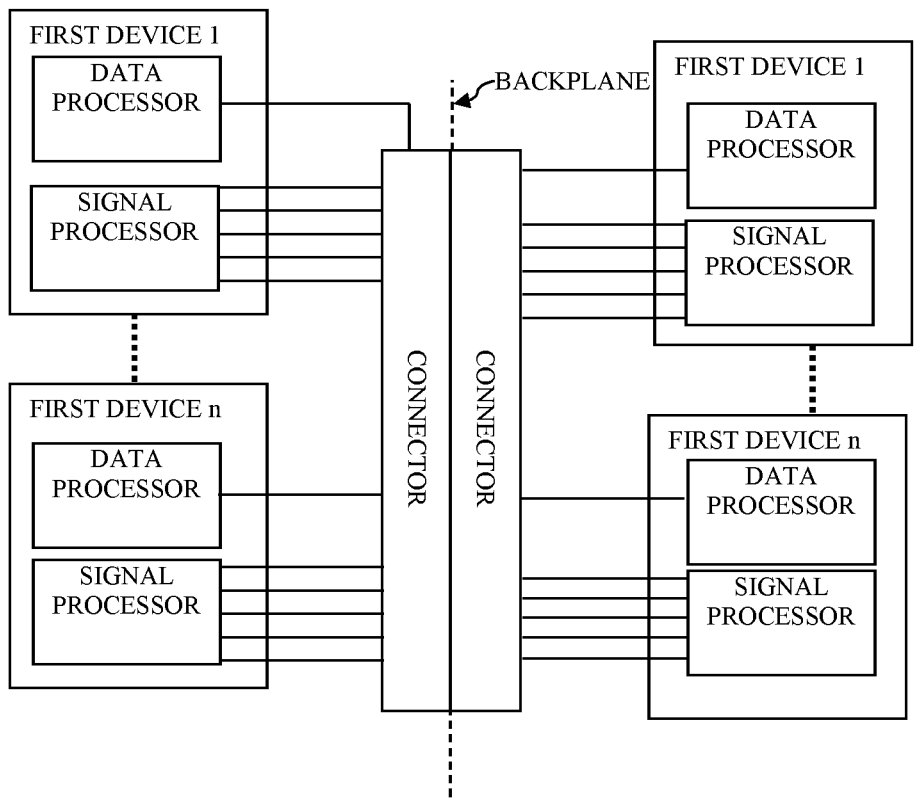
FIG. 1 illustrates a conventional block diagram of devices connected to a backplane.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In one embodiment, the present disclosure relates to system architecture for communication of devices over one or more backplanes. The system architecture comprises at least one first device and second device for sending, receiving and processing signals, at least one TDM bus for sending and receiving data and signals over the backplane, at least one MapMux device coupled to at least one first device and the TDM bus, and at least one MapMux device coupled to at least one second device and the TDM bus. The system further comprises at least one data bus for sending and receiving data to and from at least one MapMux device and a selection unit for selecting a predetermined functionality of the MapMux device.

In another embodiment of the present disclosure, the predetermined functionality of the MapMux device is selected from a group comprising mapping and de-mapping, multiplexing and de-multiplexing.

In yet another embodiment of the present disclosure, upon selection of predetermined functionality as mapping and de-mapping, at least one of the MapMux devices maps the signals and data on the TDM bus in appropriate time slots.

In still another embodiment of the present disclosure, upon selection of predetermined functionality as multiplexing and de-multiplexing, at least one of the MapMux devices multiplexes the signals and data on the TDM bus in appropriate time slots.

In another embodiment of the present disclosure, the TDM buses are connected to the backplane using a backplane connector.

In yet another embodiment of the present disclosure, control signals are selected from a group comprising slot identification signals, active or passive indication signals, and active or passive overwrite signals.

In still another embodiment of the present disclosure, status signals are selected from a group comprising module present signals, health status of various system clocks, and interrupt signals.

An embodiment of the present disclosure relates to method for communicating between a plurality of devices connected over one or more backplanes. The method comprises receiving a first input, an incoming data and a first select signal by at least one MapMux device connected to a plurality of first devices. Then, the first input is multiplexed to output a first processed data and the incoming data is de-multiplexed, based on the select signal, by at least one MapMux device connected to the plurality of first devices. The de-multiplexed incoming data is distributed among the plurality of first devices. The first processed data is then sent over the backplane on a TDM bus. Further, at least one MapMux device connected to a plurality of second devices receives the first processed data, a second input and a second select signal. The first processed data is then de-multiplexed for distribution among the plurality of second devices and the second input is multiplexed to generate a second processed data, based on a second select signal, by at least one MapMux device connected to the plurality of second devices. Finally, the second processed data is transferred over the backplane on the TDM bus.

In another embodiment of the present invention, the second processed data generated by the MapMux device connected to the plurality of second devices is the incoming data of the MapMux device connected to the plurality of first devices.

In yet another embodiment of the present disclosure, the output comprises data and at least one of control signals and status signals.

In still another embodiment of the present disclosure, the first processed data is sent over the TDM bus in appropriate timeslots.

Figure 2:
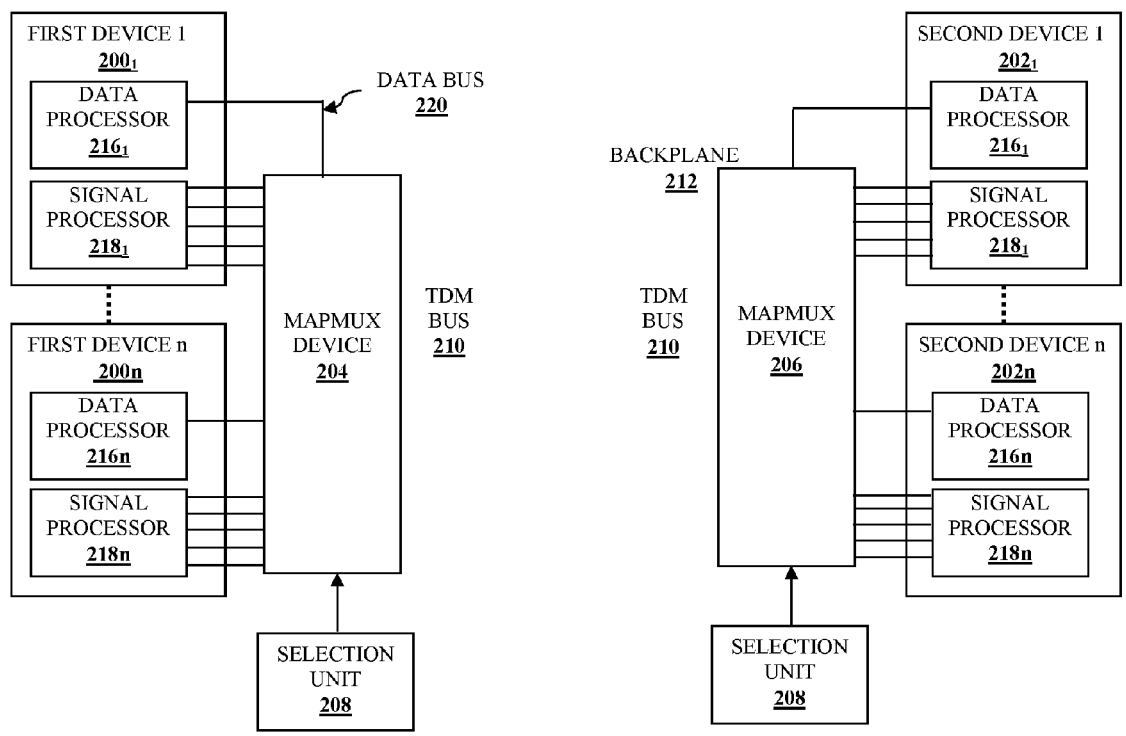
FIG. 2 illustrates a block diagram of system architecture showing interconnections between devices on a backplane in accordance with the present disclosure.

FIG. 2 illustrates a block diagram of system architecture showing interconnections between devices on a backplane in accordance with the present disclosure.

The system architecture comprises a plurality of first devices ($200_1, \ldots, 200n$, hereinafter collectively referred to as 200), a plurality of second devices ($202_1, \ldots, 202n$, hereinafter collectively referred to as 202), a MapMux device connected to the plurality of first devices 204, a MapMux device connected to the plurality of second devices 206, a selection unit 208, and a Time-division multiplexing (TDM) bus 210. The system architecture further comprises system clock and frame distribution unit (not illustrated in the figure). The devices are connected to a backplane 212 through a backplane connector 214. The present embodiment describes all the devices being connected on a single backplane. However, the devices can be distributed over more than one backplanes. In one embodiment, the plurality of first devices 200 can be network interface cards and the plurality of second devices 202 can be controllers for managing the network interface cards. In an embodiment, the plurality of second devices 202 can be classified as master controllers and slave controllers.

Each of the devices comprises a data processor ($216_1, \ldots, 216n$, hereinafter collectively referred to as 216) and a signal processor ($218_1, \ldots, 218n$, hereinafter collectively referred to as 218). The data processor 216 processes data and sends data across the backplane 212 for switching across various devices. The architecture comprises a separate data bus 220 for switching data across the devices on the backplane 212. The signal processor 218 generates various control signals and status signals which are passed between various devices. The control signals and status signals include but are not limited to network interface card present signals, slot identification signals of the network interface card, interrupt signals, active/passive identification signals for the controllers, over write control signals to overwrite the instructions of master controller by the slave controller.

The MapMux devices 204, 206 are connected to plurality of the first 200 and the second devices 202, the selection unit 208 and the backplane 212. The MapMux devices 204, 206 are connected to the backplane 212 through the TDM bus 210 and the backplane connector 214. The MapMux devices 204, 206 are configured to act as mapper and de-mapper or multiplexer and de-multiplexer based on a select signal generated by the selection unit 208. In one embodiment, there can be one MapMux device 204, 206 for each of the plurality of first and second devices (as illustrated in FIG. 2).

In an exemplary embodiment, the MapMux device 204 connected to the plurality of first devices 200 receives a first input comprising data and a plurality of control and status signals from one or more of the plurality of first devices 200. In addition, the MapMux device 204 receives a select signal from the selection unit 208 and an incoming data from the TDM bus. The select signal configures the MapMux device to function as multiplexer and de-multiplexer or mapper and de-mapper. In one embodiment, the select signal selects a predetermined functionality as multiplexer and de-multiplexing. The MapMux device 204 then multiplexes the received status and control signals and puts the multiplexed signals onto specific timeslots of the TDM bus 210. At the same time, the MapMux device 204 de-multiplexes the incoming data received from the TDM bus. The de-multiplexed incoming data is then distributed among the plurality of first devices.

TDM bus 210 allows putting of multiple signals in a single stream using time slots. Each signal is the reassembled at the receiving end based on the timing.

The multiplexed signals pass over the backplane 212 through the TDM bus 210 and arrive at input interface of the MapMux device 206 connected to the plurality of second devices 202. Along with the multiplexed signals, the MapMux device 206 receives a second input comprising data and a plurality of control and status signals from one or more of the plurality of first devices 202. The MapMux device 206 separates the individual signals by de-multiplexing the received signals and routes the signal to the plurality of second devices 202. At the same time, the MapMux device 206 multiplexes the second input and puts the multiplexed second input onto specific timeslots of the TDM bus 210. This multiplexed second input acts as incoming data for the plurality of first devices.

In this way, there is no requirement of separate pin for each of the signals passed between the multiple devices. All the signals can be sent on one pin by multiplexing the received signals.

Figure 3:
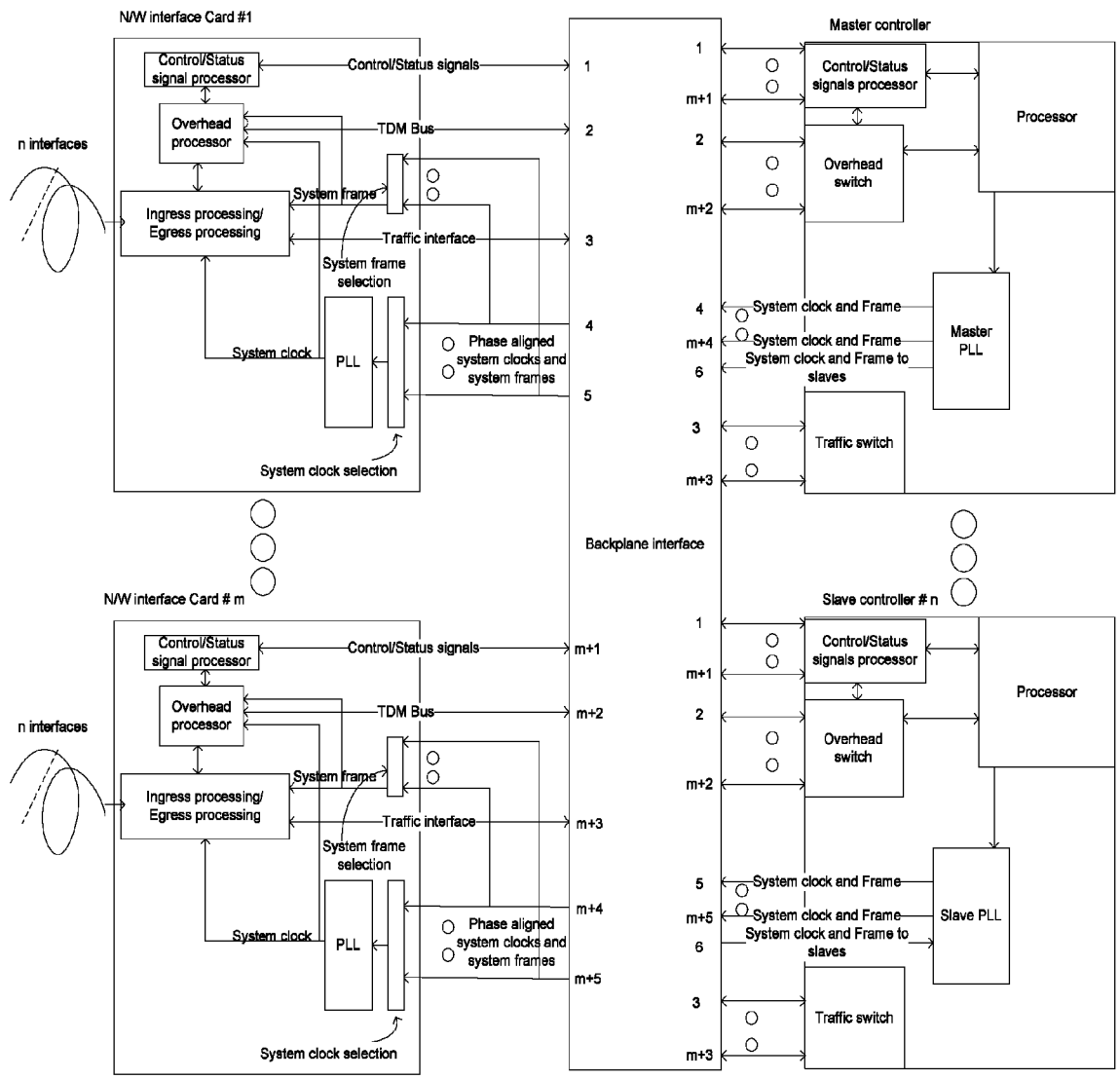
FIG. 3 illustrates a block diagram of network elements in accordance with one embodiment of the present disclosure.

FIG. 3 illustrates a block diagram of network elements in accordance with one embodiment of the present disclosure.

The present disclosure includes a plurality of network components. The network components includes but are not limited to at least one network interface cards, traffic switch cards, one or more master controller, plurality of slave controllers, master PLL, slave PLL and PLL for the network interface cards. Network interface card terminates various network interfaces like E1, E3, DS1, DS3, STM-n, OC-n etc.

As shown in FIG. 1, m number of network interface cards are connected to at least one master controller and n number of slave controllers. The network interface cards consist of ingress/egress processor to do the processing on the various network interfaces. The ingress/egress processor also extracts overhead data from the network interfaces and sends the data to overhead processor. The overhead processor maps the overhead data into specific time slots of TDM bus. This mapped data is sent to controllers overhead switch to switch various time slots across various network interfaces. Further, some time slots are routed to the processor of controller for further processing. The said system also consists of master PLL, Slave PLL and PLL in line card to distribute system clock and system frame signal across various devices in the network element. There also exists control and status signals processor both in network interface cards and controller cards to exchange various control and status signals like slot identification signals, active/passive indication, interrupt signals, active/passive overwrite signals etc.

The master controller is configured to perform a variety of functions including but not limited to configuring traffic switch, synchronizing the system, configuring and controlling one or more network interface cards, servicing interrupt signals from various elements in the telecommunication systems.

Figure 4:
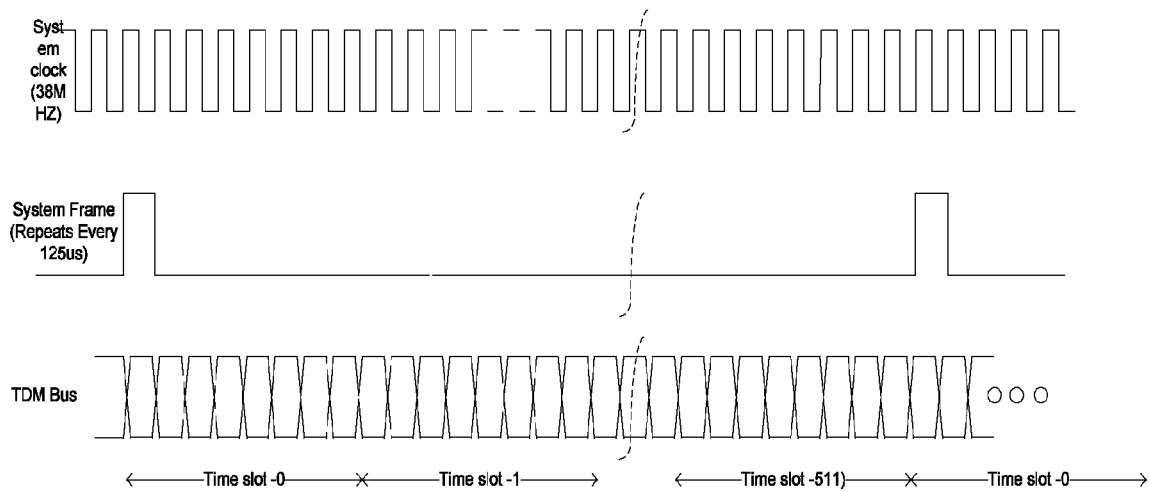
FIG. 4 illustrates the different time slots in TDM bus accordance with the present disclosure.

FIG. 4 illustrates the different time slots in TDM bus accordance with the present disclosure.

FIG. 4 shows 512 time slots for mapping various overhead bytes. Some of these time slots (10 time slots) are reserved for mapping various status or control signals. For example, consider a case where there are two controller cards, 12 interface cards and 20 status or control signals running between each of the line card to each of the controller card. This makes 40 pins requirement at line card backplane interface and 240 pins requirement at controller card backplane interface. Using the method of the present disclosure, these backplane interface pins requirement for control or status signals are made zero and control and status signals backplane interface in FIG. 1 is no more required. Further, the future expansion of the network element to include more control or status signals can be easily incorporated by reserving some time slots in the TDM bus.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system architecture for communication of devices over a backplane, comprising:
    a plurality of first devices for performing at least one of sending, receiving and processing input signals, wherein the input signals comprise at least one of status signals and control signals;
    at least one MapMux device connected to the plurality of first devices, a Time Division Multiplexing (TDM) bus and a selection unit, to perform a predetermined functionality based on a select signal obtained from a selection unit, wherein the predetermined functionality includes:
        mapping of the input signals obtained from each of the plurality of first devices, to output a first processed data to at least one of other devices over the TDM bus; and
        de-mapping of an incoming data obtained from at least one of the other devices over the TDM bus.

2. The system architecture as claimed in 1, wherein the TDM bus is connected to the backplane using a backplane connector.

3. The system architecture as claimed in 1, wherein the control signals are selected from a group comprising slot identification signals, active or passive indication signals, and active or passive overwrite signals.

4. The system architecture as claimed in 1, wherein the status signals are selected from a group comprising module present signals, health status of various system clocks, and interrupt signals.

5. The system architecture as claimed in claim 1, wherein the incoming data is generated by at least one MapMux device associated with at least one of the other devices.

6. The system architecture as claimed in claim 1, wherein the de-mapped incoming data is distributed among the plurality of first devices.

7. The system architecture as claimed in claim 1, wherein the first processed data is sent over the TDM bus in appropriate timeslots.

8. A method for communicating between a plurality of devices connected over a backplane, said method comprising:
    receiving input signals from each of a plurality of first devices, and a select signal from a selection unit connected to at least one MapMux device, by at least one MapMux device connected to the plurality of first devices wherein the input signals comprise at least one of status signals and control signals;
    performing a predetermined functionality by the at least one MapMux device based on the select signal, wherein the predetermined functionality comprises:
        mapping of the input signals to output a first processed data; and
        de-mapping of an incoming data obtained over the TDM bus from at least one other device from the plurality of devices connected over the backplane; and
    sending the first processed data over the TDM bus to at least one of the other devices.

9. The method as claimed in claim 8, wherein the incoming data is generated by at least one MapMux device associated with at least one of the other devices.

10. The method as claimed in claim 8, wherein the first processed data is sent over the TDM bus in appropriate timeslots.

11. The method as claimed in claim 8, wherein the de-mapped incoming data is distributed among the plurality of first devices.

12. The method as claimed in 8, wherein the TDM bus is connected to the backplane using a backplane connector.

13. The method as claimed in claim 8, wherein the control signals are selected from a group comprising slot identification signals, active or passive indication signals, and active or passive overwrite signals.

14. The method as claimed in claim 8, wherein the status signals are selected from a group comprising module present signals, health status of various system clocks, and interrupt signals.

* * * * *